United States Patent [19]

Kato

[11] Patent Number: 5,333,290
[45] Date of Patent: Jul. 26, 1994

[54] DMA CONTROLLER HAVING JUMP FUNCTION

[75] Inventor: Taiji Kato, Tokyo, Japan

[73] Assignee: NEC Corporation, Tokyo, Japan

[21] Appl. No.: 741,936

[22] Filed: Aug. 8, 1991

[30] Foreign Application Priority Data

Aug. 8, 1990 [JP] Japan .................. 2-209886

[51] Int. Cl.$^5$ .................................... G06F 12/00
[52] U.S. Cl. .................... 395/400; 364/242.31; 364/242.3
[58] Field of Search .................. 395/400, 425

[56] References Cited

U.S. PATENT DOCUMENTS

| | | | |
|---|---|---|---|
| 4,658,349 | 4/1987 | Tabata et al. | 395/425 |
| 4,723,223 | 2/1988 | Hanada | 395/425 |
| 4,864,533 | 9/1989 | Hanada | 395/425 |
| 4,924,410 | 5/1990 | Hamada | 395/153 |
| 4,980,828 | 12/1990 | Kapcio | 364/413.13 |
| 5,109,501 | 4/1992 | Kaneko et al. | 395/425 |
| 5,291,582 | 3/1994 | Drako et al. | 395/425 |

FOREIGN PATENT DOCUMENTS

122770 6/1986 Japan .
239854 6/1986 Japan .

*Primary Examiner*—Rebecca L. Rudolph
*Attorney, Agent, or Firm*—Whitham, Curtis & Whitham

[57] ABSTRACT

A direct memory access (DMA); controller for controlling data transfer between a memory and an input/output (I/O) device comprises an address counter for counting an address to be supplied to the memory, and a read/write controller for controlling a read/write operation between the memory and the I/O device. A jump start address register is provided to hold a jump start address, and an address comparator compares a content of the address counter with a content of the jump start address register. When the address comparator detects consistence between the content of the address counter and the content of the jump start address register, the read/write controller operates to stop the read/write operation between the memory and the I/O device.

2 Claims, 2 Drawing Sheets

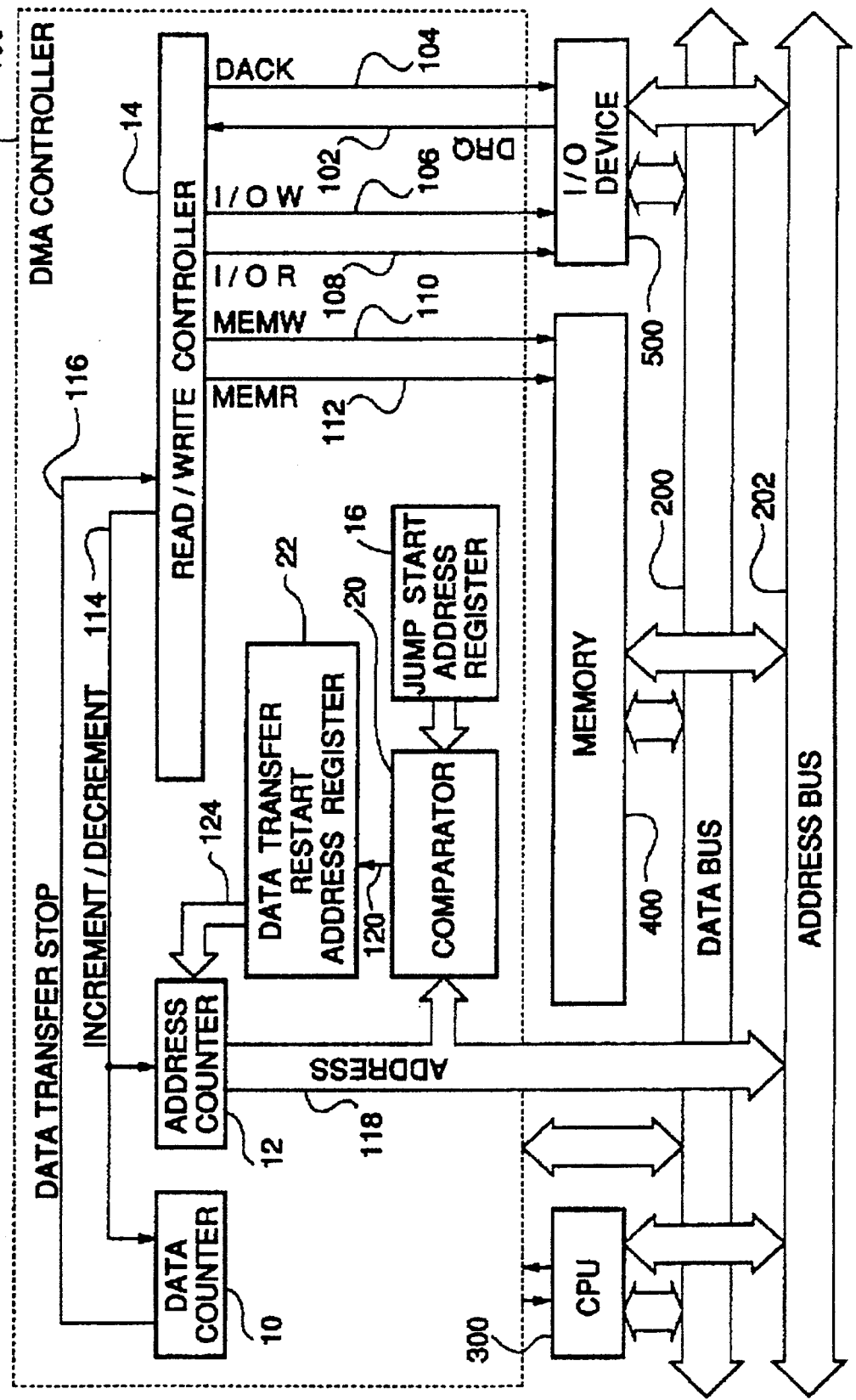

DMA CONTROLLER HAVING JUMP FUNCTION

BACKGROUND OF THE INVENTION

1. Field of the Invention

The present invention relates to a DMA (direct memory access) controller, and more specifically to a DMA controller used in a microcomputer system for transferring data between a memory and an I/O (input/output) device.

2. Description of Related Art

In a conventional microcomputer system, a DMA controller for controlling a direct data transfer between a memory and an I/O device which are coupled in common to a data bus, includes a data counter, an address counter and a read/write controller.

When the read/write controller receives a DMA request from the I/O device, the read/write controller outputs a DMA acknowledge to the I/O device, and at the same time, outputs read/write control signals to the memory and the I/O device, respectively. For example, when data is transferred from the memory to the I/O device, the read/write controller outputs a read control signal and a write control signal to the memory and the I/O device, respectively. To the contrary, when data is transferred from the I/O device to the memory, the read/write controller outputs a read control signal and a write control signal to the I/O device and the memory, respectively.

On the other hand, when the DMA is requested, the DMA controller, particularly the data counter and the address counter are initialized by a CPU (central processing unit) included in the microcomputer system. In the course of the DMA operation, the read/write controller decrements the data counter, and increments or decrements the address counter. A content of the address counter is supplied to the memory as an address to be accessed.

Thus, a large amount of data can be directly transferred between the memory and the I/O device through the data bus but without the intermediary of the CPU.

When the content of the data counter becomes zero, the data counter outputs a data transfer stop signal to the read/write controller so as to stop operation of the read/write controller.

In the above mentioned conventional DMA controller, if a memory area not to be read or written exists between a data transfer start address and a data transfer end address in the memory, it is necessary to stop the data transfer just before the memory area not to be read or written, and then, to initialize the DMA controller, again, so that the data transfer is restarted just after the memory area not to be read or written. However, as mentioned above, the initialization of the DMA controller is executed by the CPU, an extra load is given to the CPU in the course of the data transfer in the DMA mode. As a result, a system efficiency of the microcomputer is decreased.

SUMMARY OF THE INVENTION

Accordingly, it is an object of the present invention to provide a DMA controller which has overcome the above mentioned defect of the conventional one.

Another object of the present invention is to provide a DMA controller capable of transferring data by bypassing a memory area not to be read/written, without the intermediary of a CPU.

The above and other objects of the present invention are achieved in accordance with the present invention by a DMA controller for controlling data transfer between a memory and an I/O device. The DMA controller comprises an address counter for counting an address to be supplied to the memory, a read/write controller for controlling a read/write operation between the memory and the I/O device, a jump start address register for holding a jump start address, and an address comparator for comparing a content of the address counter with a content of the jump start address register, the read/write controller operating to stop the read/write operation between the memory and the I/O device when the address comparator detects consistence between the content of the address counter and the content of the jump start address register.

The above and other objects, features and advantages of the present invention will be apparent from the following description of preferred embodiments of the invention with reference to the accompanying drawings.

BRIEF DESCRIPTION OF THE DRAWINGS

FIG. 2 is a block diagram of a second embodiment of the DMA controller in accordance with the present invention.

DESCRIPTION OF THE PREFERRED EMBODIMENTS

Figure 1:
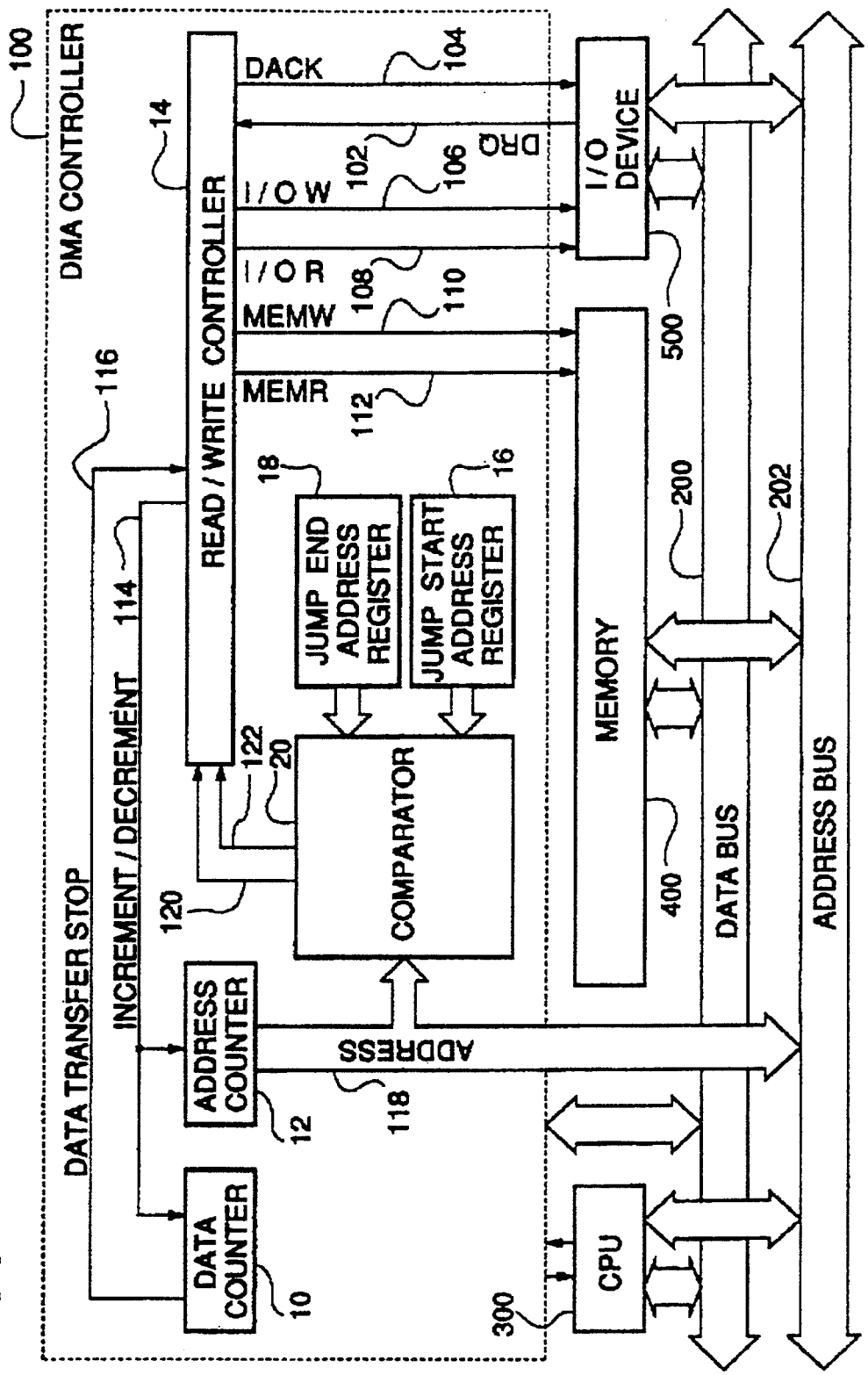
FIG. 1 is a block diagram of a first embodiment of the DMA controller in accordance with the present invention.

Referring to FIG. 1, there is shown a block diagram of a first embodiment of the DMA controller in accordance with the present invention. The shown DMA controller is generally designated by Reference Numeral 100, and is coupled to a data bus 200 and an address bus 202. In addition, a CPU 300, a memory 400, and an I/O device 500 are also coupled to each of the data bus 200 and the address bus 202.

The DMA controller 100 includes a data counter 10, an address counter 12, a read/write controller 14, a jump start address register 16, a jump end address register 18, and an address comparator 20, as shown in FIG. 1.

The read/write controller 14 receives a DMA request DRQ from the I/O device 500 through a DMA request signal line 102, and outputs a DMA acknowledge DACK to the I/O device 500 through a DMA acknowledge signal line 104. The read/write controller 14 also outputs an I/O write control signal I/OW and an I/O read control signal I/OR to the I/O device 500 through an I/O write control signal line 106 and an I/O read control signal line 108, respectively. In addition, the read/write controller 14 outputs a memory write control signal MEMW and a memory read control signal MEMR to the memory 400 through a memory write control signal line 110 and a memory read control signal line 112, respectively.

Furthermore, the read/write controller 14 supplies a decrement/increment control signal through a line 114 to the data counter 10 and the address counter 12. When a content of the data counter 10 becomes zero, the data counter 10 outputs a data transfer stop signal through a line 116 to the read/write controller 14. A content of the address counter 12 is supplied as an address through a bus 118 and the address bus 202 to the memory 400, and also supplied to the comparator 20. The comparator 20 compares the address on the bus 118 with a content of the jump start address register 16 and a content of the jump end address register 18, respectively. When the address on the bus 118 becomes consistent with the content of the jump start address register 16, the comparator 20 outputs a first coincidence signal 120 to the read/write controller 14. When the address on the bus 118 becomes consistent with the content of the jump end address register 18, the comparator 20 outputs a second coincidence signal 122 to the read/write controller 14.

The data counter 10, the address counter 12, the jump start address register 16, and the jump end address register 18 are initialized by the CPU 300 before the DMA operation is started.

When the read/write controller 14 receives the DMA request signal DRQ 102 from the I/O device 500, the read/write controller 14 outputs the DMA acknowledge signal DACK 104 to the I/O device 500. At this time, the data counter 10, the address counter 12, the jump start address register 16, and the jump end address register 18 are set with respective initial values through the data bus 200 by the CPU 300. Specifically, the data counter 10 is set with a value corresponding to the amount of data transfer, and the address counter 12 is set with a data transfer start address of the memory 400. The jump start address register 16 is set with an address of the memory 400 just before a memory area which should not be read or written, and the jump end address register 18 is set with a last address of the memory area which should not be read or written.

When data is transferred from the memory 400 to the I/O device 500, the read/write controller 14 outputs an active memory read control signal MEMR 112 and an active I/O write control signal I/OW 106 to the memory 400 and the I/O device 500, respectively. On the other hand, when data is transferred from the I/O device 500 to the memory 400, the read/write controller 14 outputs an active I/O read control signal I/OR 108 and an active memory write control signal MEMW 110 to the I/O device 500 and the memory 400, respectively.

On the other hand, the read/write controller 14 supplies the increment/decrement control signal 114 to the data counter 10 and the address counter 12, so that the data counter 10 is decremented, and the address counter 12 is incremented or decremented so as to supply the address 118 to the memory 400 and the comparator 20. Thus, a large amount of data can be directly transferred between the memory 400 and the I/O device 500 through the data bus 200 but without the intermediary of the CPU 300.

In the course of the DMA data transfer, at each time the address counter 12 is updated (namely, incremented or decremented), the comparator 20 compares the content of the address counter 12 with the content of the jump start address register 16 and the content of the jump end address register 18, respectively.

If the content of the address counter 12 becomes consistent with the content of the jump start address register 16, the comparator 20 generates the first coincidence signal 120. In response to the first coincidence signal 120, the read/write controller 14 performs only the updating of the address counter 12.

After the address counter 12 is updated, the comparator 20 again compares the content of the address counter 12 with the content of the jump start address register 16 and the content of the jump end address register 18, respectively. If the content of the address counter 12 is consistent with neither the content of the jump start address register 16 nor the content of the jump end address register 18, the comparator generates neither the first coincidence signal 120 nor the second coincidence signal 122. In this condition, the read/write controller 14 performs only the updating of the address counter 12. Accordingly, after the content of the address counter 12 becomes consistent with the content of the jump start address register 16, but before the content of the address counter 12 becomes consistent with the content of the jump end address register 18, only the address counter 12 is repeatedly updated, and the data counter 10 is not updated and the data transfer between the memory 400 and the I/O device 500 is stopped or suspended.

When the content of the address counter 12 becomes consistent with the content of the jump end address register 18, the comparator 20 generates the second coincidence signal 122. In response to the second coincidence signal 122, the read/write controller 14 restarts its read/write control operation so that the data transfer between the memory 400 and the I/O device 500 is performed again, and both of the data counter 10 and the address counter 12 are updated.

When the content of the data counter 10 becomes zero, the data counter 10 generates the data transfer stop signal 116 to the read/write controller 14, so that the read/write controller deactivates the memory read control signal MEMR 112 and the I/O write control signal I/OW 106 or the I/O read control signal I/OR 108 and the memory write control signal MEMW 110. Thus, the data transfer is completed.

Referring to FIG. 2, there is shown a block diagram of a second embodiment of the DMA controller in accordance with the present invention. In FIG. 2, elements similar to those shown in FIG. 1 are given the same Reference Numeral, and explanation thereof will be omitted for simplification of the specification.

In the second embodiment, the jump end address register 18 is omitted, and a data transfer restart address register 22 is provided, which receives the first coincidence signal 120 and writes a data transfer restart address through a bus 124 to the address counter 12 in response to the first coincidence signal 120.

Now, only operation of the second embodiment different from that of the first embodiment will be explained.

At each time the address counter 12 is updated (namely, incremented or decremented), the comparator 20 compares the content of the address counter 12 with the content of the jump start address register 16. If the content of the address counter 12 becomes consistent with the content of the jump start address register 16, the comparator 20 generates the first coincidence signal 120. In response to the first coincidence signal 120, the data transfer restart address register 22 writes the data transfer restart to the address counter 12, so that the rewritten content of the address counter 12 is supplied through the bus 118 and the address bus 202 to the memory 400. On the other hand, without recognizing the jump of the address, the read/write controller 14 continues to update the data counter 10 and the address counter 12, and to control the memory 400 and the I/O device 500 so that the data transfer is performed without interrupt.

As seen from the above, a jump area is previously set in the registers in the DMA controller, and data transfer is executed by bypassing the jump area in the memory without the intermediary of the CPU. Therefore, it is possible to write data from the I/O device to the memory by bypassing the jump area in the memory, without aid of the CPU. In addition, it is possible to read data from the memory to the I/O device by bypassing the jump area in the memory, without aid of the CPU. Accordingly, it is possible to eliminate the extra load to the CPU in the course of the DMA data transfer.

The invention has thus been shown and described with reference to the specific embodiments. However, it should be noted that the present invention is in no way limited to the details of the illustrated structures but changes and modifications may be made within the scope of the appended claims.

I claim:

1. A direct memory access (DMA) controller for controlling data transfer between a memory and an input/output (I/O) device, the DMA controller comprising:

an address counter for counting an address to be supplied to said memory, a read/write controller for controlling a read/write operation between said memory and said I/O device, a jump start address register for holding a jump start address, an address comparator for comparing a content of said address counter with a content of said jump start address register, said read/write controller operating to stop said read/write operation between said memory and said I/O device when said address comparator detects consistence between said content of said address counter and said content of said jump start address register, and means for updating said content of said address counter, wherein said address counter is updated by said means for updating while said read/write controller operates to stop said read/write operation, said DMA controller further including a jump end address register for holding a jump end address, said address comparator operating to compare said content of said address counter with a content of said jump end address register, and said read/write controller operating to restart said read/write operation between said memory and said I/O device when said address comparator detects consistence between said content of said address counter and said content of said jump end address register.

2. A direct memory access controller for controlling data transfer between a memory and an input/output device, the direct memory access controller comprising:

an address counter for counting an address to be supplied to said memory;

a read/write controller for controlling a read/write operation between said memory and said input/output device;

a jump start address register for holding a jump start address;

a jump end address register for holding a jump end address;

means for updating a content of said address counter; and an address comparator for comparing said content of said address counter with a content of said jump start address register and a content of said jump end address register, said read/write controller operating to stop said read/write operation between said memory and said input/output device when said address comparator detects consistence between said content of said address counter and said content of said jump start address register, said address counter continuing to be updated by said means for updating while said read/write controller operates to stop said read/write operation, said read/write controller operating to restart said read/write operation between said memory and said input/output device when said address comparator detects consistence between said content of said address counter and said content of said jump end address register.

* * * * *